United States Patent Office 3,766,234
Patented Oct. 16, 1973

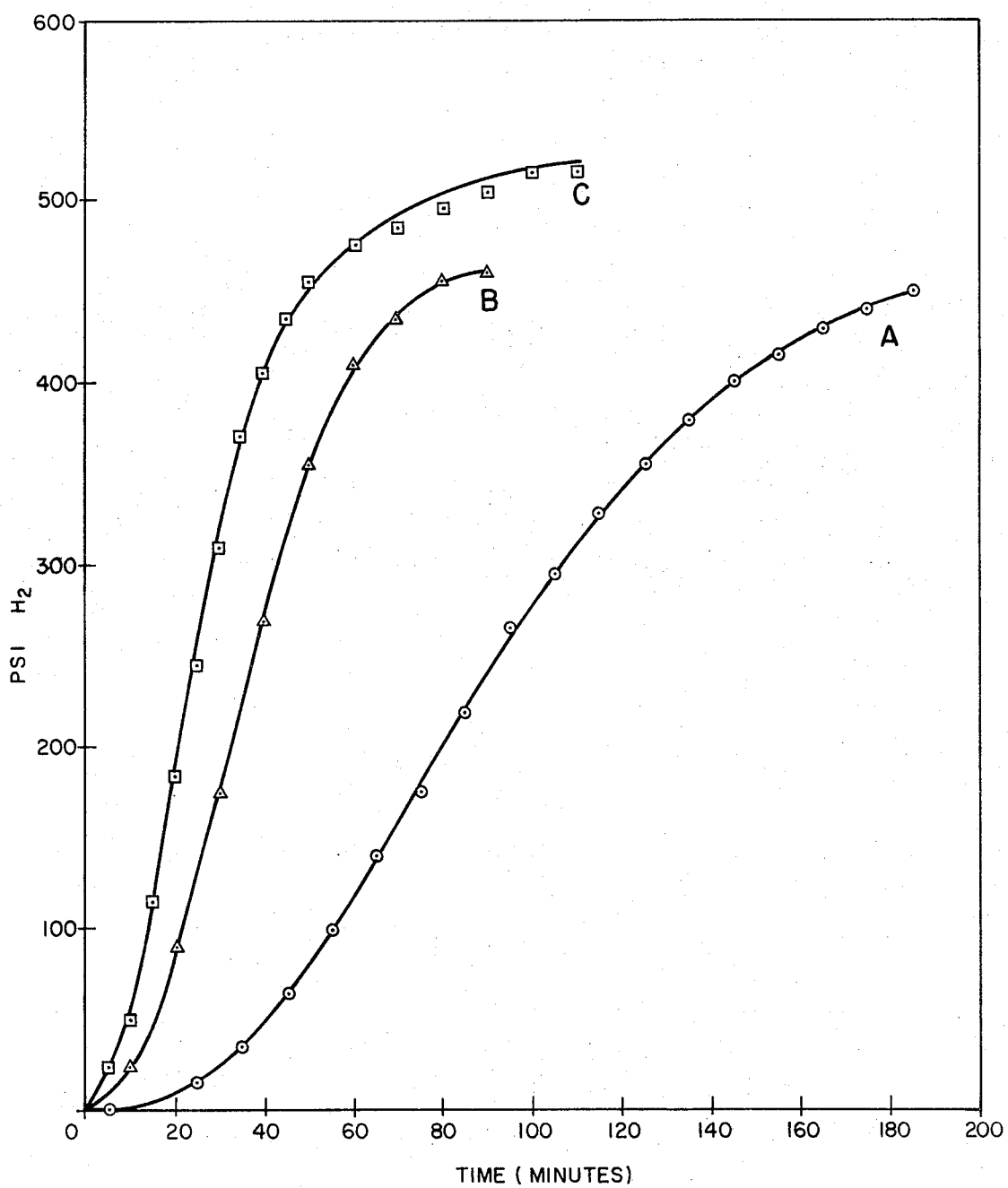

3,766,234
METHOD FOR MAKING ALKYLALUMINUM COMPOUNDS
Warren B. Kirsch, Baton Rouge, La., assignor to Ethyl Corporation, Richmond, Va.
Filed Dec. 16, 1970, Ser. No. 98,646
Int. Cl. C07f 5/06
U.S. Cl. 260—448 A
5 Claims

ABSTRACT OF THE DISCLOSURE

A method of preparing alkylaluminum compounds by reacting aluminum or aluminum alloy with an alkylaluminum compound and hydrogen or a mixture of an alkylaluminum compound, hydrogen and olefin, in the presence of a catalytic or activating amount of a complex alkali metal or alkaline earth metal compound.

BACKGROUND OF THE INVENTION

This invention relates to a method of manufacturing alkylaluminum compounds from aluminum or alloys of aluminum. More particularly, it relates to a method for manufacturing alkylaluminum compounds by allowing aluminum or an alloy containing aluminum to react with an alkylaluminum compound and hydrogen, or mixture of them with an olefin, in the presence of a specific activating agent or catalyst.

K. Ziegler et al. have suggested a method in which an alkylaluminum compound was directly manufactured by the reaction of aluminum with hydrogen or with hydrogen and an olefin, in the presence of the alkylaluminum compound. (See, for example, Angew. Chem., vol. 67, No. 16, 424 (1955); Ann. der Chem., vol. 629, 1 (1960); U.S. Pat. No. 2,835,689; British Pat. No. 770,707; German Pat. No. 1,048,276; Japanese patent publication No. 5,710/1957.)

In such method, it is necessary to employ aluminum material from which aluminum oxide film firmly covering its surface has been removed, to secure speedy progress of the reaction. For that purpose, K. Ziegler et al. have suggested that the aluminum was finely divided or cut in a specific liquid prepared for the prevention from oxygen, for example, in a hydrocarbon solvent containing a small amount of an alkylaluminum compound, or that the aluminum in molten state was jetted into the specific liquid as mentioned above in the presence of an inert atmosphere. (See, for example, Ann. der Chemie, vol. 629, 1 (1960).) However, such method has some difficulties from economical point of view, especially when carried out in a large scale continuous process.

Besides such mechanical activation method, Elmer et al. have suggested a method in which inative aluminum was chemically activated prior to the reaction by heat-treatment under superatmospheric pressure of hydrogen in the presence of an organometallic compound, such as alkylaluminum, arylaluminum and alkylberyllium, or a metal hydride, such as aluminum hydride and calcium hydride, at least at 150° C. but below the ultimate decomposition temperature of the organometallic compound or the metal hydride. (See, for example, British Pat. No. 808, 705; Japanese patent publication No. 7,906/1959; U.S. Pat. No. 2,921,876; British Pat. No. 808,706; British Pat. No. 808,707; Japanese publication No. 2,252/1959.)

Also Elmer et al. has suggested a method in which inactive aluminum was activated by heat-treatment in the presence of an alkylaluminum compound added with a small amount of an activation-promoting agent, such as an alkali metal, an alkali-earth metal, and an oxide and a hydroxide thereof. (See, for exmple, U.S. Pat. No. 2,892,-738; Japanese patent publication No. 15,754/1960).

Additionally, U.S. Pat. No. 3,402,190 discloses a method for activating inactive aluminum and inactive aluminum alloys utilizing an organo-oxy metal as an activator or catalyst. Alkoxides of sodium, lithium, potassium and magnesium are particularly disclosed.

SUMMARY OF THE INVENTION

The present invention relates primarily to a method for manufacturing alkylaluminum compounds by reacting aluminum or an aluminum alloy with an alkylaluminum compound and hydrogen or with a mixture of an alkylaluminum compound, hydrogen and an olefin, in the presence of a catalyst which is a complex alkali metal or alkaline earth metal compound which has been complexed with a trialkylaluminum compound, a dialkylaluminum hydride or a dialkylaluminum halide wherein at least one of the organo-aluminum bonds is an ethyl aluminum bond.

The catalyst has the general formula $$MY_n \cdot Al(C_2H_5)RX$$

wherein M is an alkali metal or an alkaline earth metal; Y is hydrogen (H), chlorine (Cl), fluorine (F), hydroxyl group (OH), cyanide group (CN), alkyl group (R') or alkoxy group (OR''); $n$ is an integer in accordance with the valences of M and Y; R is hydrogen or a hydrocarbyl group selected from alkyl, alkenyl, alkynyl, aralkyl, aryl and alkaryl having up to twenty carbon atoms; and X is halogen or the same as R. Catalysts of hydrocarbyl groups of $C_2$ to $C_4$ are preferred.

A most preferred catalyst is a sodium alkylaluminum hydride, e.g., sodium triethylaluminum hydride, sodium tetraethylaluminum and sodium diethylaluminum dihydride. Particularly good results have been obtained using a catalyst of the formula NaH·xTEA·yDEAH, wherein $x+y=5$, but may equal at least 1 and preferably equals 3 to 5. (TEA is triethylaluminum and DEAH is diethylaluminum hydride.)

Preferred alkali metals are sodium, potassium and lithium, with sodium being the most preferred. Preferable alkaline earth metals are magnesium and calcium with calcium being the more preferred.

Some examples of MY compounds are sodium hydride, sodium hydroxide, sodium cyanide, potassium chloride, sodium ethoxide, sodium butoxide and potassium butoxide.

Some examples of alkyl groups (R') are ethyl, propyl, isobutyl, n-butyl, sec-butyl, pentyl, hexyl, heptyl, octyl, octadecyl and eicosyl. Alkyl groups having from two to four carbon atoms are most preferred.

Some examples of alkoxy groups (OR'') are ethoxy, n-propoxy, isopropoxy, n-butoxy, phenoxy and p-tolyloxy.

Some examples of hydrocarbyl groups (R) and (X) are ethyl, propyl, isobutyl, n-butyl, sec-butyl, pentyl, hexyl, heptyl, octyl, decyl, eicosyl, lauryl, benzyl, cyclohexyl, vinyl, ethynyl, phenyl, tolyl, xylyl, mesityl, naphthyl, fluorenyl and indenyl.

Some examples of halides are chloride, bromide and fluoride.

The complex metal compound catalyst may be prepared or formed in situ or may be added to the hydroalumination reactants.

BRIEF DESCRIPTION OF THE DRAWINGS

FIG. 1 of the drawings is a graph illustrating the effectiveness of the catalyst of the present invention.

DESCRIPTION OF THE PREFERRED EMBODIMENT

In the preferred embodiment of the invention, a quantity of aluminum-silicon alloy in the form of shavings or other similarly comminuted particles are charged into a stirred autoclave along with about 50 percent excess over stoichiometry of triisobutylaluminum and a small amount of a liquid sodium ethylaluminum hydride.

The autoclave is heated to 120° C. and charged with 1500 p.s.i.g. hydrogen. Total reaction time is 15 hours.

Aluminum and its alloys employed as material in the present invention may be any of commercially available products, such as finely divided aluminum and atomized aluminum. Other forms of aluminum or aluminum alloys such as blown powder, shavings, foils or turnings cut from a lathe or drilling machine, and other types of cut fragments may also be used. The aluminum and its alloys may have a film of aluminum oxide at their surface, caused by air or oxygen. Aluminum alloys suitable in the present invention are those including silicon, iron or titanium. In the case of aluminum-silicon binary alloys, those having a composition of 40–99 percent by weight of aluminum and 1–60 percent by weight of silicon, are preferred. In the case of ternary alloys such as aluminum-silicon-iron (Al-Si-Fe), alloys having the composition of 40–98 percent by weight of aluminum, and 1–59 percent by weight of silicon, and 1–15 percent by weight of iron are preferred. In the case of ternary alloys, such as aluminum-silicon-titanium (Al-Si-Ti), alloys having the composition of 40 to 98 percent by weight of aluminum, 1 to 58 percent by weight of silicon, and 0.2 to 10 percent by weight of titanium. In the case of quaternary alloys, such as Al-Si-Fe-Ti, alloys having the composition of 40 to 98 percent by weight of aluminum, 1 to 58 percent by weight of silicon, 1 to 15 percent by weight of iron, and 0.2 to 10 percent by weight of titanium, are preferred. Small or impurity amounts of other metals such as magnesium, calcium and copper may be included in the alloy. Further, metals such as aluminum, silicon and iron or their carbide or oxide may be included in the alloy in the form of a mixture.

The alkylaluminum compound employed as one of the materials used in the present invention is represented by the general formula, RR'AlR'', wherein R and R' are respectively selected from alkyl radicals having three to twenty carbon atoms and R'' is selected from the group consisting of alkyl radicals, hydrogen or halogen. Preferred alkylaluminum compounds are di-n-propylaluminum hydride, tri-n-propylaluminum, triisobutylaluminum, diisobutylaluminum hydride and mixtures thereof. Some examples of other suitable aluminum alkyl compounds are ethyl-dipropylaluminum, diethylaluminum chloride, diethylaluminum bromide, diisobutylaluminum chloride, diisobutylaluminum bromide, dioctylaluminum chloride, dioctylaluminum bromide, dipentadecylaluminum chloride, dipentadecylaluminum bromide, didocosylaluminum chloride, diphenylaluminum hydride, diphenylaluminum chloride, di-para-tertiary-butyl phenylaluminum hydride, di-para-tertiary-butylphenylaluminum chloride, phenyloctylaluminum hydride, phenyloctylaluminum chloride, triphenylaluminum, tri-para-tertiary-butylphenylaluminum, diphenyloctylaluminum, dioctylaluminum hydride, dipentadecylaluminum hydride, didocosylaluminum hydride, ditetracontylaluminum hydride, trioctylaluminum, tripentadecylaluminum and tridocosylaluminum.

The olefins employed in the present invention are alpha-olefins having three to twenty carbon atoms of which typical examples are propylene, n- and isobutylene, 2-methyl-1-pentene and 2-ethyl-1-hexene. Olefins having internal double bonds are less reactive and are therefore not preferable.

The alpha-olefins employed in the present invention may be one kind or a mixture of more than one kind and may contain catalytic amounts of ethylene.

In carrying out the process, the aluminum or its alloy, the activating agent itself or a solution or dispersion in a liquid medium of the activating agent, and an alkylaluminum compound are charged in a reaction vessel, and hydrogen with or without an olefin is introduced into the vessel to manufacture the corresponding alkylaluminum compound. In such step, activation of inactive aluminum or its alloy sufficiently proceeds even at such a low temperature as 100–200° C., and the alkylaluminum compound can be manufactured.

The catalysts or activating agents suitable for use in the present invention are those which are liquid at the reaction temperature or which are soluble in the reaction mixture at the reaction temperature.

The amount of the activating agent employed is preferably at least 0.01 percent per amount of aluminum or its alloy. In the event of using the activating agent singly or in the form of solution or suspension, or along with an alkylaluminum compound it is desirable that the aluminum or its alloy forms a slurry and can be well stirred, if it is in a finely divided form.

To insure an efficient reaction, the reaction mixture is thoroughly agitated. Such agitation may be effected by the well-known mechanical stirring or by other suitable means such as circulation.

Suitable temperature ranges for the reaction in the manufacture of the alkylaluminum compounds are 70–250° C. and more preferably 100–180° C.

The handling of materials before and after reaction is generally conducted under an inert atmosphere, such as nitrogen, argon or hydrogen.

The reaction may also be carried out in the presence of an inert liquid medium such as a hydrocarbon or organic solvent. Some examples are hexane, heptane, octane, dodecane, benzene, toluene, xylene, cyclohexane, kerosine, mineral oil, and the like, and mixtures thereof.

Alternatively, activation of the aluminum or aluminum alloy may be conducted separately. In this case, the aluminum is heated with the metal alkylaluminum hydride activating agent previously described. The activating agent may be used directly or in a solution or suspension in a suitable liquid medium. The liquid medium may be any of inert organic solvents, such as hexane, heptane, octane, dodecane, benzene, toluene, xylene, cyclohexane, kerosine and mineral oil.

The following examples are set forth by way of illustration and not by way of limitation.

EXAMPLE A

A number of tests were run to determine the effect of various catalysts or activating agents on the depletibility of aluminum-silicon alloy in the hydroalumination reaction. The aluminum-silicon alloy used was a 92Al-8Si (92% aluminum and 8% silicon by weight) nominal composition, prepared by melting the appropriate amounts of commercially pure aluminum and silicon in a graphite crucible. The molten alloy was allowed to cool and solidify and was removed from the graphite crucible in the form of a small ingot about 1" in diameter by about 2" long.

The ingot was then placed in a lathe and the outer skin removed to remove any carbide contamination from the graphite crucible. Two different alloy samples A and B having the 92Al-8Si nominal composition were used in the tests. The actual composition, as determined by X-ray fluorescence analysis (XRF), are given in the footnotes of Tables I and II, hereinafter.

The hydroalumination reaction was carried out in a 300 ml. stirred autoclave, using triisobutylaluminum (TIBA) as the aluminum alkyl for reaction with hydrogen at 1500 p.s.i.g. at 120° C. for 15 hours.

The data for the first series of runs are summarized in Table I. Experimental details are as follows: Into a 300 ml. stirred autoclave, charge:

(1) 100 ml. (79 g.) TIBA. The same batch of TIBA was used for all runs. The diisobutylaluminum hydride (DIBAH) content was 8%.
(2) 4.00 g. of alloy A in the form of shavings cut from an ingot with a carbide-tipped saw blade. (3.89 g. for runs 13 and 14). The shavings were 1–2 mm. wide, 2–4 mm. long and they averaged about 0.1 mm. thick.

Each alloy charge was split out by quartering from the bulk sample, so that it would be representative. The TIBA/Al mole ratio≅3, which represents about 50% excess of TIBA over stoichiometry.

(3) An appropriate amount of catalyst, sodium ethoxide was charged as a solid to run 5, and as a dilute solution in toluene to runs 6 and 7. For runs 1, 2 and 3, five ml. of a liquid sodium alkyl aluminum hydride was used. It was prepared by reaction of sodium metal and diethylaluminum hydride containing about 70% DEAH-30% TEA (triethylaluminum) and filtering off the aluminum metal formed. Analysis of the resultant sodium ethylaluminum hydride liquid complex showed it to contain 8.1% sodium.

The autoclave was pressure tested with $H_2$ and vented. It was then heated to 120° C. and charged with 1500 p.s.i.g. $H_2$. The pressure was maintained at 1400–1500 p.s.i.g. for five hours, after which it was increased to 1750 p.s.i.g. Timers were set to turn off the heater and stirrer after 10 additional hours. Pressure charts indicated 1350–1500 p.s.i.g. at shut-down (unattended). Total reaction time was 15 hours.

The reaction mixtures were worked up under nitrogen with special care to collect all of the solid residue. Solids adhering to the stirrer were washed down into the reactor with a benzene stream from a wash bottle. Similarly, the solids were transferred to a medium glass fritted Buchner funnel. The residue was washed well with benzene, petroleum ether, vacuum dried for 30 minutes and weighed. The amount of aluminum reacted out of the alloy was calculated by difference in weights of starting alloy and residue.

A second series of tests is shown in Table II, with an alloy B prepared of very similar composition. The charge consisted of 100 ml. TIBA, 4.00 g. of alloy B, and the appropriate quantity of catalyst. The alloy form was again saw cut shavings, but with the 20 mesh fines removed. Also, these shavings were thicker than those of alloy A, averaging about 0.15 mm. The TIBA used was the same batch as the first series, and all alloy charges were split out by quartering. All catalyst charges were weighed, including the liquid catalyst used in run 10. All other experimental details were identical to the first series, except that in this series heat-up was accomplished under 1000 p.s.i.g. $H_2$.

The data in Table I indicate that the aluminum depletions obtained were dependent on both the nature and concentration of the catalyst used. The sodium ethylaluminum hydride complex gave depletions of 82–90%; no catalyst gave a depletion of 38%. Sodium ethoxide at low concentration gave a 46–48% depletion and a 68% depletion at higher concentration. Similar results were obtained in the second series of runs. The sodium ethylaluminum hydride gave the best depletion. Sodium ethoxide, sodium fluoride and sodium diisobutylaluminum dihydride were allabout equivalent and gave better depletions than when no catalyst was used. The lower depletions for the second series are attributed to the use of thicker shavings than were used in the first series.

TABLE I.—DEPLETION OF ALLOY A

| Run No. | Catalyst Type | Conc., percent [1] | Residue weight, g. | Alloy [2] charge, g. | Percent depletion |
|---|---|---|---|---|---|
| 1 | NaH·XTEA·YDEAH | .5 Na | 0.71 | 3.89 | 90 |
| 2 | NaH·XTEA·YDEAH | .5 Na | 0.70 | 3.89 | 90 |
| 3 | NaH·XTEA·YDEAH | .5 Na | 1.03 | 4.00 | 82 |
| 4 | No catalyst | | 2.62 | 4.00 | 38 |
| 5 | NaOEt | .7 Na | 1.55 | 4.00 | 68 |
| 6 | NaOEt | (.01 Na)+ | 2.34 | 4.00 | 46 |
| 7 | NaOEt | .01 Na | 2.27 | 4.00 | 48 |

[1] All concentrations expressed as wt. percent of species shown based on TIBA, except run No. 6.
[2] Alloy A prepared to contain 92% Al, 8% Si. Analysis (XRF); 90.4% Al, 7.1% Si, 0.3% Fe, 0.0% Ti.
[3] Depletions are calculated as follows:

$$\text{Percent depletion} = \frac{\text{Alloy charge} - \text{Residue weight}}{\text{Alloy charge} \times \text{percent Al}} \times 100$$

[4] 0.01 wt. percent NaOEt based on Al in alloy.

TABLE II.—DEPLETION OF ALLOY B

| Run No. | Catalyst Type | Conc., percent [1] | Residue weight, g. | Alloy [2] charge, g. | Percent depletion |
|---|---|---|---|---|---|
| 8 | No catalyst | | 2.97 | 4.00 | 28 |
| 9 | NaOEt | 0.6 | 2.07 | 4.00 | 53 |
| 10 | NaH·XTEA·YDEAH | 0.6 | 1.46 | 4.00 | 70 |
| 11 | NaF | 0.6 | 1.97 | 4.00 | 56 |
| 12 | NaH$_2$Al(.1-Bu)$_2$ | 0.6 | 1.98 | 4.00 | 56 |

[1] All concentrations expressed at wt. percent Na based on TIBA.
[2] Alloy B prepared to contain 92% Al, 8% Si. Analysis (XRF); 90.8% Al, 8.1% Si, 0.3% Fe, <0.1% Ti.
[3] Depletions calculated on weight loss, total aluminum.

EXAMPLE B

Hydroaluminations of TNPA were made with and without TEA and with and without sodium using similar equipment as described in Example A. The results of the tests are illustrated in FIG. 1 of the drawing. Curve A is the result of hydroaluminating TNPA with and without TEA. In the runs which produced curve A, the autoclave was charged with 100 milliliters TNPA and 14 g. of −100 mesh aluminum alloy which contained 53.6% aluminum, 35.2% silicon, 4.6% iron and 2.0% titanium. A similar run wherein 10 milliilters of TEA is substituted for 10 milliliters of TNPA produces essentially the same curve as curve A. Curve A is therefore illustrative of two runs, i.e., one run with 100 milliliters of TNPA and one run with 90 milliliters TNPA and 10 milliliters of TEA.

Curve B is the result of hydroaluminating TNPA in the presence of sodium without TEA or other alkylaluminum compound. In the run resulting in curve B, 90 milliliters of TNPA, 14 g. of the same alloy plus 10 milliliters of a solution made by dissolving 8 g. of sodium in 100 g. of TNPA and then filtering the aluminum metal formed, was charged to the autoclave.

Curve C is the result of hydroaluminating TNPA with both sodium and TEA. Curve C represents the reaction wherein 80 milliliters of TNPA, 10 milliliters of TEA, 14 g. of the same alloy and 10 milliliters of the same catalyst solution, were charged to the autoclave.

In each run, the autoclave was pressure tested at 1000 p.s.i.g. of hydrogen and vented. The autoclave was then heated to 140° C. and held for one hour. The temperature was maintained at 140° C.±1° C. The stirrer was stopped and hydrogen was set to 1250 p.s.i.g. Stirring was started and the pressure time curve recorded. The novel and unexpected results are clearly seen.

The foregoing disclosure and description of the invention is illustrative and explanatory thereof and various changes may be made within the scope of the appended claims without departing from the spirit of the invention.

What is claimed is:

1. A method of manufacturing alkylaluminum compounds having at least three carbon atoms, comprising: reacting aluminum or aluminum alloys with a mixture selected from the group consisting of an alkylaluminum compound and hydrogen or an alkylaluminum compound, hydrogen and an olefin, the said alkylaluminum compound being selected from the group consisting of di-n-propylaluminum hydride, tri - n - propylaluminum, triisobutylaluminum, diisobutylaluminum hydride and mixtures thereof, in the presence of a catalyst or activating agent having the general formula $MY_n \cdot Al(C_2H_5)RX$, wherein M is sodium; Y is hydrogen, fluorine, chlorine, hydroxyl group, cyanide group, alkyl group or alkoxy group; $n$ is an integer in accordance with the valences of M and Y; R is hydrogen or a hydrocarbyl group having up to twenty carbon atoms; and X is hydrogen, halogen or hydrocarbyl group having up to twenty carbon atoms.

2. The method of claim 1, wherein the reaction is conducted at a temperature from about 70° C. to about 250° C.

3. The method of claim 1, wherein the catalyst or activating agent is a sodium ethylaluminum hydride.

4. The method of claim 1, wherein the reaction is carried out in an inert hydrocarbon medium.

5. The method of claim 1, wherein when an olefin is reacted, the olefin contains catalytic amounts of ethylene.

References Cited

UNITED STATES PATENTS

| | | | |
|---|---|---|---|
| 3,687,994 | 8/1972 | Kobetz et al. | 260—448 A |
| 3,050,540 | 8/1962 | Gould | 260—448 A |
| 3,557,174 | 1/1971 | Becker et al. | 260—448 A |
| 3,402,190 | 9/1968 | Toyoshima et al. | 260—448 A |
| 3,012,042 | 12/1961 | Blitzer et al. | 260—448 A |
| 3,026,345 | 3/1962 | Dobartz | 260—448 A |
| 3,046,290 | 7/1962 | Podall | 260—448 A |

FOREIGN PATENTS

| | | | |
|---|---|---|---|
| 1,485,721 | 6/1967 | France | 260—448 A |
| 1,216,304 | 5/1966 | Germany | 260—448 A |
| 1,114,192 | 7/1957 | Germany | 260—448 A |
| 1,126,869 | 4/1962 | Germany | 260—448 A |

HELEN M. S. SNEED, Primary Examiner

PO-1050
(5/69)

UNITED STATES PATENT OFFICE
CERTIFICATE OF CORRECTION

Patent No. __3,766,234__     Dated __October 16, 1973__

Inventor(s) __Warren B. Kirsch__

It is certified that error appears in the above-identified patent and that said Letters Patent are hereby corrected as shown below:

Column 1, line 54, reads "inative aluminum", should read -- inactive aluminum -- . Column 1, line 62, reads "808, 705", should read -- 808,705 -- . Column 1, line 70, reads "for exmple", should read -- for example -- . Column 4, line 58, reads "composition,", should read -- compositions, -- . Column 5, line 15, reads "$H_2$ and", should read -- $H_2$ gas and -- . Column 5, line 56, reads "allabout", should read -- all about -- . Column 5, line 62, in Table I, reads "Alloy$^2$", should read -- Alloy$^3$ -- . Column 5, line 68, in Table I, reads "(.01 Na)$^+$", should read -- (.01 Na)$^2$ -- . Column 5, line 63-64, in Table I reads "Percent Depletion", should read -- Percent Depletion$^4$ -- . Column 5, line 71, in Table I, Footnote 2 should be Footnote 3. Column 5, line 72, in Table I, Footnote 3 should be Footnote 4. Column 5, line 75, in Table I, Footnote 4 should be Footnote 2. Column 6, line 3-4, in Table II, reads "Percent Depletion", should read -- Percent Depletion$^3$ -- . Column 7, line 10, reads "3,012,042", should read -- 3,013,042 -- .

Signed and sealed this 9th day of April 1974.

(SEAL)
Attest:

EDWARD M.FLETCHER,JR.
Attesting Officer

C. MARSHALL DANN
Commissioner of Patents